March 15, 1960

H. A. WILCOX 2,929,008

ELECTRIC MOTOR

Filed March 7, 1955

INVENTOR.
HOWARD A. WILCOX

BY

ATTORNEYS

March 15, 1960

H. A. WILCOX 2,929,008

ELECTRIC MOTOR

Filed March 7, 1955

INVENTOR.
HOWARD A. WILCOX

BY

ATTORNEYS

March 15, 1960 H. A. WILCOX 2,929,008
ELECTRIC MOTOR
Filed March 7, 1955 3 Sheets-Sheet 3
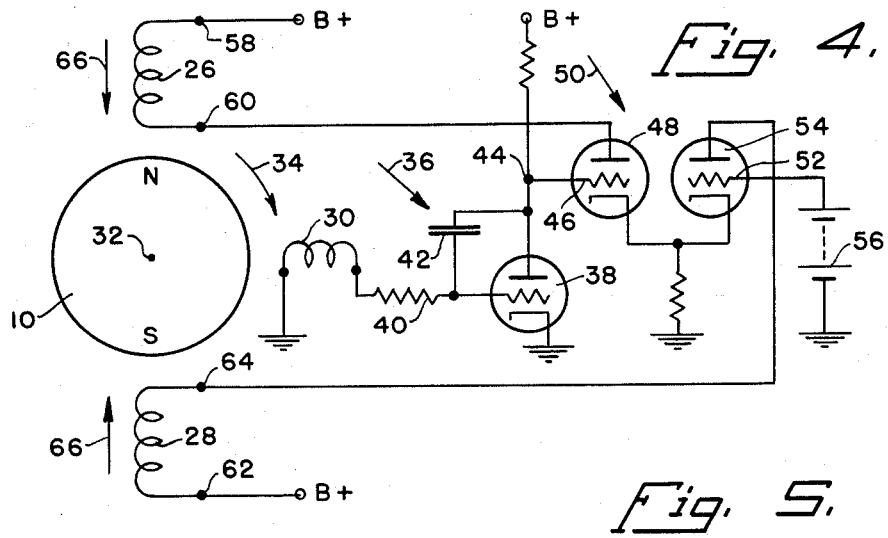
Fig. 4.
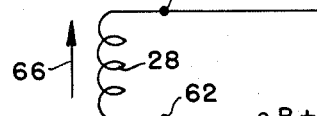
Fig. 5.
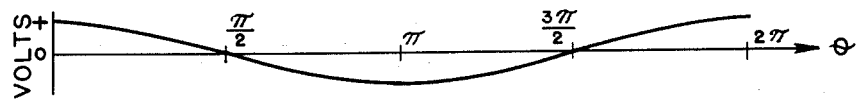
Fig. 6.
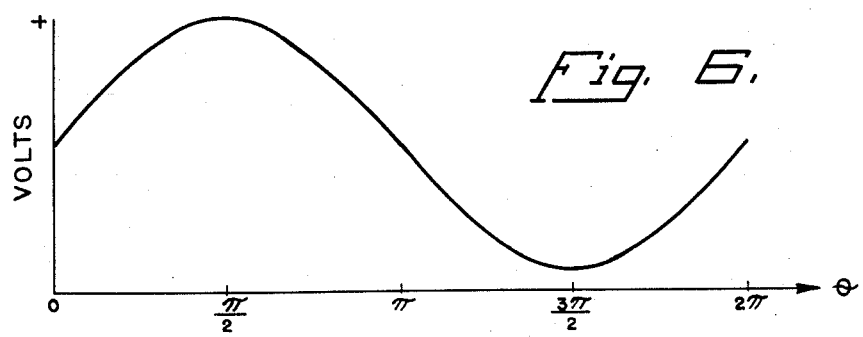
Fig. 7.
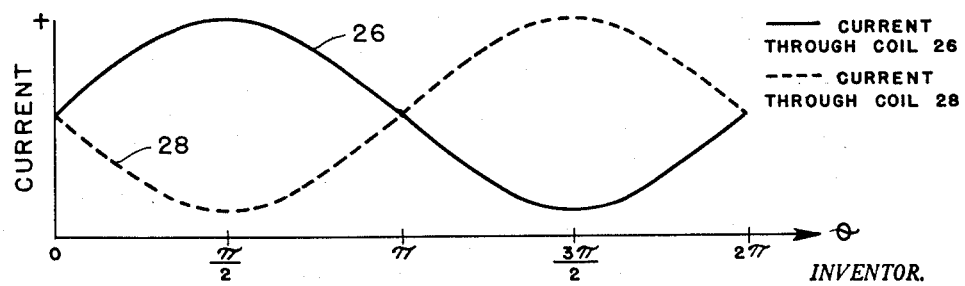
INVENTOR.
HOWARD A. WILCOX
BY
ATTORNEYS United States Patent Office 2,929,008
Patented Mar. 15, 1960

2,929,008

ELECTRIC MOTOR

Howard A. Wilcox, China Lake, Calif., assignor to the United States of America as represented by the Secretary of the Navy Application March 7, 1955, Serial No. 492,810

5 Claims. (Cl. 318—138)

(Granted under Title 35, U.S. Code (1952), sec. 266)

The invention described herein may be manufactured and used by or for the Government of the United States of America for governmental purposes without the payment of any royalties thereon or therefor.

This invention relates to electric motors, and in particular to an electric motor for driving the rotor of a gyroscope.

The rotor of the motor constituting this invention is permanently magnetized. As the rotor turns, magnetic flux from the permanent magnet through a pickup coil varies, and induces voltages in the pickup coil which are amplified and shifted in phase by an integrator circuit. The output voltage of the integrator circuit is then used to control a differential amplifier which in turn energizes the motor drive coils of the motor so that the motor develops substantially constant torque from all speeds from very low to the maximum speed of the rotor and will drive the rotor in only one direction.

It is, therefore, an object of this invention to provide an improved electric motor particularly suited for use in driving the rotor of a gyroscope.

It is a further object of this invention to provide an improved electric motor in which the torque developed is substantially constant for all speeds of the rotor from very slow to the maximum speed of the rotor.

It is a still further object of this invention to provide an improved electric motor for use in a gyroscope having a permanently magnetized rotor which does not exert mechanical or electrically induced restraints on the rotor.

Other objects and many of the attendant advantages of this invention will be readily appreciated as the same become better understood by reference to the following detailed description when considered in connection with the accompanying drawings wherein.

Figure 3:
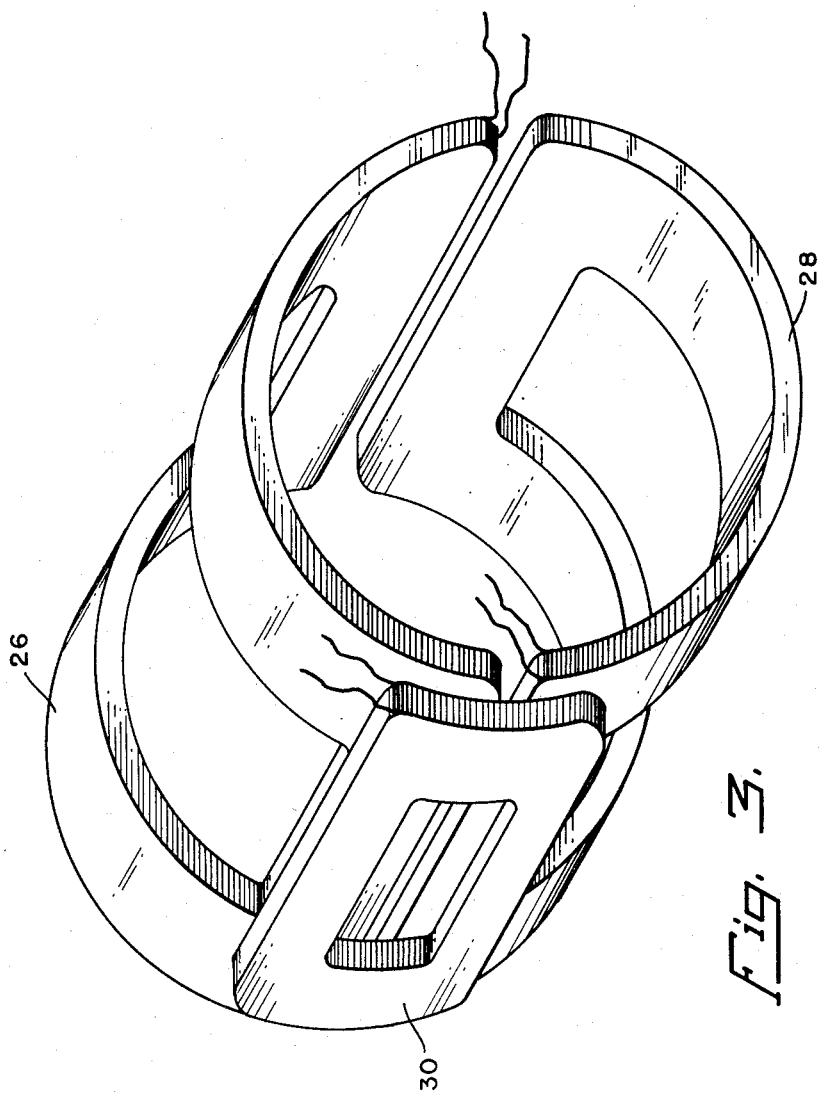

Fig. 3 is a schematic perspective view of the motor drive windings and the pickup coil, Fig. 4 is a schematic diagram of the motor, Fig. 5 is a plot of voltage induced in the pickup coil against the angular position of the rotor, Fig. 6 is a plot of the voltage of the grid of one of the tubes of the differential amplifier against the position of the rotor, and Fig. 7 is a plot of current through the motor drive coils against the angular position of the rotor.

Figure 1:
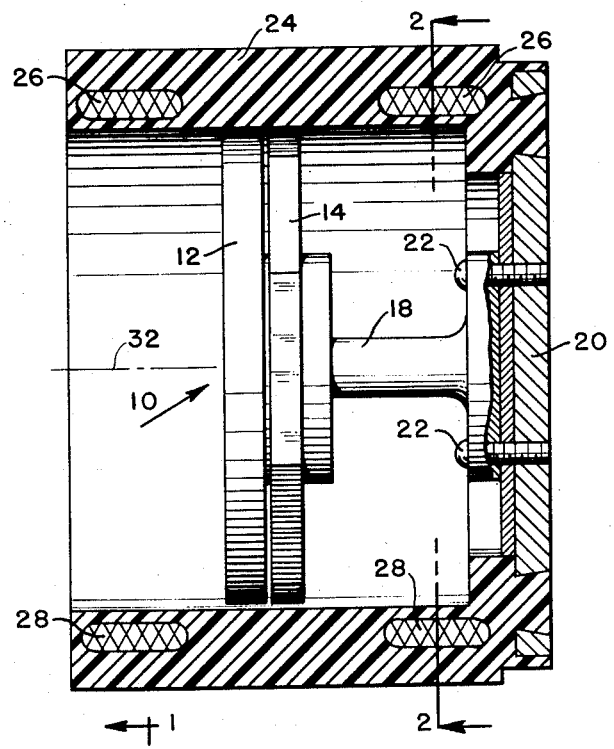
Fig. 1 is a section taken on line 1—1 of Fig. 2.
Figure 2:
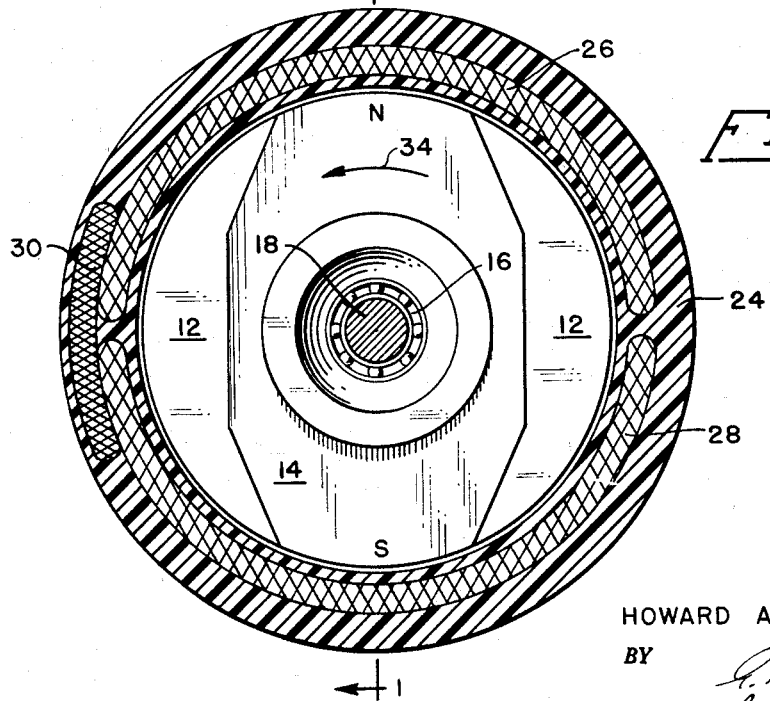
Fig. 2 is a section taken on line 2—2 of Fig. 1.

Referring now to the drawings wherein like reference characters designate like or corresponding parts throughout the several views, there is seen in Fig. 1 a rotor 10 of a gyroscope. Rotor 10 is comprised of a cylindrical disc 12 which provides mass and a permanent magnet 14 which is fixedly secured to disc 12. The poles of magnet 14 are located near the circumference of rotor 10 and lie on a straight line which substantially passes through the center of rotor 10. Magnet 14, in a preferred example, is made of "Alnico V," an alloy consisting of 8% aluminum, 14% nickel, 24% cobalt, 3% copper, and the remainder iron. Rotor 10 is mounted on a conventional universal ball bearing 16 so as to have two degrees of precessional freedom. Bearing 16 in turn is mounted on post 18 which is secured to base plate 20 by screws 22. Plastic housing 24 is formed so as to be permanently secured to base plate 20. Motor drive coils 26, 28 and pickup coil 30 are embedded in, or formed in, housing 24. In Fig. 3 housing 24 is omitted so that the relative positions of the motor drive coils 26, 28 and pickup coil 30 with respect to each other may be more easily discerned. From Figs. 1, 2, 3 and 4 it is seen that the centers of motor drive coils 26, 28 substantially lie on a line which intersects the axis of rotation 32 of rotor 10. This point of intersection is also approximately the point about which rotor 10 precesses, or the center of movement of rotor 10. Coils 26, 28 are equal sized, have the same number of turns, are concentric with respect to rotor 10, and extend around rotor 10 through an angle which is just slightly less than 180°. The widths of the motor drive coils 26, 28 are also substantially the same. A straight line through the center of pickup coil 30 which is normal to axis 32 will intersect substantially at right angles the line between the centers of motor drive coils 26, 28. Pickup coil 30, as seen in Fig. 3, overlaps by an equal amount portions of the motor drive coils 26, 28 so that there is no coupling between the pickup and motor drive coils.

In order to explain the operation of the invention, attention is directed to Fig. 4. Rotor 10 is schematically illustrated, and the relative positions of motor drive coils 26, 28 and pickup coil 30 are shown as viewed from the left of Fig. 1. If rotor 10 is turning in the direction indicated by arrow 34 at a constant angular velocity, then the voltage induced in coil 30 will vary as shown in Fig. 5, where the initial, or zero position, of rotor 10 corresponds to the orientation of the rotor as illustrated in Fig. 4. The voltage induced in pickup coil 30 due to the rotation of rotor 10 about its axis of rotation 32 is applied to the integrator circuit 36 which includes a thermionic high gain tube 38, a grid resistor 40 and a feedback capacitor 42. Integrator circuit 36 is a conventional circuit and is known as a "Miller Integrator." The plate voltage of tube 38 at terminal 44 will lag the voltage induced in pickup coil 30 by 90°, as is well known. A plot of the plate voltage, or output voltage, of integrator circuit 36 against the position of rotor 10 is seen in Fig. 6. Grid 46 of thermionic tube 48 of a conventional differential amplifier 50 is directly coupled to the plate of tube 38. The potential of grid 52 of tube 54 of differential amplifier 50 is held constant with respect to ground by suitable source of D.C. potential such as battery 56. Terminal 58 of motor drive coil 26 is connected to a suitable source of plate potential and terminal 60 is connected to the plate of tube 48. Terminal 62 of motor drive coil 28 is connected to the source of plate potential and terminal 64 of motor drive coil 28 is connected to the plate of tube 54.

The time integral of the voltage induced in pickup coil 30 is proportional to the total change of magnetic flux through it and is determined solely by the strength of magnet 14. Hence the torque developed will be substantially constant irrespective of the speed at which rotor 10 is turning over the speed range from the minimum to the maximum.

When the potential of the grid 46 of tube 48 is at its minimum value, current flow through coil 26 will also be at a minimum, and the current flow through motor drive coil 28 will be at a maximum. The current flow through coil 26 will be in phase with the grid voltage of tube 48 and the current flow through coil 28 will be 180° out of phase with the current in coil 26, as shown in Fig. 7. If rotor 10 is the rotor of a gyroscope, it is caged, by conventional caging means, which are not illustrated, prior to energizing the motor so that the axis of rotation 32 of the rotor is coincident with the longitudinal axis of post 18, for example, as illustrated in Fig. 1. Rotor 10 is given an initial rotation by any suitable means. The slow rotation of rotor 10 will cause the magnetic flux through the pickup coil 30 to change inducing a voltage in coil 30. Integrating circuit 36 integrates the voltage, and the output voltage of the integrator circuit is directly applied to grid 46 of tube 48 of amplifier 50. Coils 26, 28 are wound and connected in the circuit, in a preferred manner, so that the magnetic fields produced are in the direction indicated by arrows 66 in Fig. 4. The magnitudes of the magnetic field produced by motor drive coils 26, 28 vary sinusoidally as a function of the orientation of rotor 10 as seen in Fig. 7. Intersection between the magnetic field of magnet 14 and the sinusoidally varying fields of motor drive coils 26, 28 produces torque which turns rotor 10 in the direction indicated by arrow 34.

The D.C. components of the magnetic fields of motor drive coils 26, 28 cancel each other because of the location of motor drive coils 26, 28 with respect to each other. Rotor 10 is driven only in one direction, the direction being determined by the orientation of the motor drive coils 26, 28 and pickup coil 30 as well as the manner of connection of pickup coil 30 to the integrator circuit 36.

Because of the arrangement of the components of the motor, and the action of integrator circuit 36 and differential amplifier 50, the motor will drive at constant torque for all speeds from very low to maximum speed, as stated earlier. The maximum speed is reached when the back E.M.F. in the motor drive coils due to the rotation of the magnetic field of magnet 14 with rotor 10 substantially equals the applied plate voltage. This permits accurate speed regulation to be easily obtained.

Obviously many modifications and variations of the present invention are possible in the light of the above teachings. It is, therefore, to be understood that within the scope of the appended claims the invention may be practiced otherwise than as specifically described.

What is claimed is:

1. A unidirectional driving electric motor comprising a rotor, means for mounting the rotor for rotation about an axis of rotation, means for forming a magnetic field rotating with said rotor, a pair of motor drive coils, a pickup coil, said pickup coil being mounted so that rotation of said magnetic field forming means induces an E.M.F. in said pickup coil, means for amplifying and shifting the phase of the voltage induced in said pickup coil, and means responsive to said amplified and phase shifted voltage for energizing said motor drive coils to cause said rotor to turn in only one direction.

2. An electric mootr comprising a rotor, means for mounting the rotor for rotation about an axis of rotation, means forming a permanent magnetic field fixedly mounted on said rotor, a pair of motor drive coils, a pickup coil, said pickup coil being mounted so that the rotation of said magnetic field forming means induces an electromotive force in said pickup coil, means for amplifying the voltage induced in the pickup coil and for shifting its phase substantially 90°, and means electrically connected to the motor drive coils for varying the currents through said motor drive coils responsive to the phase shifted and amplified voltage so that said motor develops a substantially constant torque throughout the speed range of said motor.

3. An electric motor comprising a rotor, means for mounting the rotor for rotation about an axis of rotation, a permanent magnet for providing a magnetic field mounted on said rotor, a pair of motor drive coils, a pickup coil, said pickup coil being mounted so that the rotation of said permanent magnet induces an electromotive force in said pickup coil, means for amplifying the voltage induced in the pickup coil and for shifting its phase, and means for varying the magnitude of the electrical currents through said motor drive coils responsive to the phase shifted and amplified voltage so that said motor develops a substantially constant torque throughout the speed range of said motor.

4. An electric motor, comprising a gyro rotor, means for mounting the rotor for rotation about an axis of rotation, means for establishing a permanent magnetic field mounted on said gyro rotor, a pair of motor drive coils, a pickup coil, means for mounting said motor drive coils so that a straight line through the centers of said coils substantially intersects the axis of rotation of said rotor, said motor drive coils being substantially equal in size, having an equal number of turns and extending equiangularly around the circumference of said rotor, said pickup coil being so mounted that a line through its center and the axis of rotation of the gyro rotor is substantially at right angles to the line through the center of the motor drive coils, an integrator circuit, means for applying voltages induced in the pickup coil to the integrator circuit, a differential amplifier having a pair of grid controlled thermionic tubes, the output of said integrator being applied to the control grid of one of the tubes of the amplifier, one of the motor drive coils being connected in the plate circuit of one of the tubes of the differential amplifier and the other motor drive coil being connected to the plate circuit of the other tube of the differential amplifier.

5. An electric motor, comprising a gyro rotor, means for mounting the rotor for rotation about an axis of rotation, a permanent magnet mounted on said gyro rotor and forming a part thereof, a pair of motor drive coils, a pickup coil, means for mounting said motor drive coils around the rotor so that a straight line through the centers of said coils substantially intersects the axis of rotation of said rotor, said motor drive coils being substantially equal in size, having substantially the same number of turns and extending around substantially one half the circumference of said rotor, said pickup coil being so mounted that a line through its center and the axis of rotation of the gyro rotor is substantially at right angles to the lines of the center of the motor drive coils, an integrator circuit, means for applying voltages induced in the pickup coil to the integrator circuit, a differential amplifier having a pair of grid controlled thermionic tubes, the output of said integrator being applied to the control grid of one of the tubes of the amplifier, one of the motor drive coils being connected in the plate circuit of one of the tubes of the differential amplifier and the other motor drive coil being connected to the plate circuit of the other tube of the differential amplifier.

References Cited in the file of this patent

UNITED STATES PATENTS

| | | |
|---|---|---|
| 1,992,826 | Karasawa | Feb. 26, 1935 |
| 2,719,944 | Brailsford | Oct. 4, 1955 |
| 2,797,376 | Meade | June 25, 1957 |
| 2,798,995 | McLean | July 9, 1957 |